(12) United States Patent
Helfrich

(10) Patent No.: US 11,429,179 B2
(45) Date of Patent: Aug. 30, 2022

(54) METHOD AND APPARATUS FOR DISABLING HIGH SPEED BUS OPERATION UNDER HIGH COMMON MODE VOLTAGE CONDITIONS

(71) Applicant: Maxim Integrated Products, Inc., San Jose, CA (US)

(72) Inventor: Kenneth J. Helfrich, Gainesville, GA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 17/084,029

(22) Filed: Oct. 29, 2020

(65) Prior Publication Data

US 2021/0048876 A1 Feb. 18, 2021

Related U.S. Application Data

(63) Continuation of application No. 15/709,177, filed on Sep. 19, 2017, now Pat. No. 10,908,671.

(60) Provisional application No. 62/402,843, filed on Sep. 30, 2016.

(51) Int. Cl.
*G06F 1/3287* (2019.01)
*G06F 1/3296* (2019.01)
*G06F 13/40* (2006.01)
*G06F 13/42* (2006.01)

(52) U.S. Cl.
CPC .......... *G06F 1/3287* (2013.01); *G06F 1/3296* (2013.01); *G06F 13/4022* (2013.01); *G06F 13/4286* (2013.01)

(58) Field of Classification Search
None
See application file for complete search history.

(56) References Cited

U.S. PATENT DOCUMENTS

| 8,156,251 | B1 | 4/2012 | Sorensen et al. |
| 8,391,420 | B1* | 3/2013 | An ...................... H04L 25/0292 375/276 |
| 8,971,423 | B1 | 3/2015 | Fu et al. |
| 9,444,357 | B1* | 9/2016 | Matthews ........... H02M 3/3353 |
| 10,606,772 | B2 | 3/2020 | Chellappan et al. |
| 2003/0140274 | A1 | 7/2003 | Neumiller et al. |
| 2004/0221077 | A1* | 11/2004 | Yen ..................... G06F 13/4072 710/100 |
| 2005/0144345 | A1 | 6/2005 | Nakano |
| 2008/0140885 | A1* | 6/2008 | Collins ............... G06F 13/4282 710/67 |

(Continued)

FOREIGN PATENT DOCUMENTS

WO PCT/CN2010/071415 10/2010

*Primary Examiner* — Henry Tsai
*Assistant Examiner* — Christopher A Bartels
(74) *Attorney, Agent, or Firm* — TIPS Group

(57) ABSTRACT

An apparatus including a handshake window enabler having a pair of differential inputs and a window enablement output, a common mode detector coupled to a power input and a ground input and having a handshake inhibit output, and a handshake disabler coupled to the handshake window enabler, the common mode detector, and the pair of differential inputs. If a common mode voltage that out of range ("too high") is detected, high speed handshake protocols are such that the bus operates a lower data rate.

18 Claims, 4 Drawing Sheets

(56) References Cited

U.S. PATENT DOCUMENTS

| | | | |
|---|---|---|---|
| 2008/0235418 A1* | 9/2008 | Werthen | G06F 13/385 |
| | | | 710/106 |
| 2009/0027003 A1 | 1/2009 | Adelman et al. | |
| 2010/0070748 A1 | 3/2010 | Duan et al. | |
| 2010/0275037 A1* | 10/2010 | Lee | G06F 13/385 |
| | | | 713/189 |
| 2010/0313059 A1* | 12/2010 | Wang | H03L 7/07 |
| | | | 713/502 |
| 2011/0131356 A1* | 6/2011 | Devam | G06F 13/426 |
| | | | 710/105 |
| 2011/0181432 A1 | 7/2011 | Ou et al. | |
| 2012/0079308 A1* | 3/2012 | Sasaki | G06F 1/3253 |
| | | | 713/340 |
| 2014/0077777 A1 | 3/2014 | Vemula | |
| 2014/0146860 A1* | 5/2014 | Wright | H03K 19/018514 |
| | | | 375/219 |
| 2014/0325201 A1 | 10/2014 | Nam | |
| 2015/0058642 A1* | 2/2015 | Okamoto | G06F 13/14 |
| | | | 713/300 |
| 2016/0019174 A1 | 1/2016 | Sreenath et al. | |
| 2016/0103781 A1 | 4/2016 | Lin et al. | |
| 2017/0168979 A1* | 6/2017 | Remple | G06F 13/4068 |
| 2017/0277249 A1* | 9/2017 | Low | G06F 13/4022 |

* cited by examiner

US 11,429,179 B2

METHOD AND APPARATUS FOR DISABLING HIGH SPEED BUS OPERATION UNDER HIGH COMMON MODE VOLTAGE CONDITIONS

CROSS REFERENCE TO RELATED APPLICATIONS

This application is a continuation of U.S. patent Ser. No. 15/709,177, filed Sep. 19, 2017, which claims the benefit of U.S. Pat. Ser. No. 62/402,843, filed Sep. 30, 2016, both of which are incorporated herein by reference.

BACKGROUND

The Universal Serial Bus (USB) is an industry standard protocol developed in the mid-1990s that defines cables, connectors and communication protocols used in a bus for connection, communication, and power supply between a computer (host) and an electronic device (client). Unlike other data buses (e.g., Ethernet, HDMI), USB connections are directed, with both upstream and downstream ports emanating from a single host. It is currently developed by the USB Implementers Forum (USB IF).

The original USB 1.0 specification, which was introduced in January 1996, defined data rates of 1.5 Mbit/s as "Low Speed" and 12 Mbit/s as "Full Speed." The USB 2.0 specification was released in April 2000 and was ratified by USB-IF at the end of 2001 and defined an additional data rate of 480 Mbit/s as "High Speed." USB 2.0 uses four shielded wires: two for power (VBUS and GND) and two for differential data signals (D+ and D−), providing half-duplex data transfers. The data rate for a USB 2.0 bus defaults to Full Speed after each bus reset but can be increased to High Speed as determined by a "handshake" protocol using out-of-band signals to verify that both host and client are capable of High Speed operation.

While the D+ and D− signals are transmitted on a differential pair with USB 2.0, they still may be affected by large common-mode differentials between the host and client when, for example, the grounds of the host and/or client are not at earth ground. This can happen in industrial settings, on airplanes, with heating, venting and air conditioning (HVAC) systems, to name a few.

Common-mode interference becomes more problematical at higher data rates, e.g. during High Speed operation of a USB 2.0 bus. There are therefore situations where it is desirable to operate a USB 2.0 bus at the slower Full Speed rate even though the devices are High Speed compatible. However, the automatic handshake protocol used after a bus reset makes Full Speed operation problematical when both the host and client are High Speed compatible.

These and other limitations of the prior art will become apparent to those of skill in the art upon a reading of the following descriptions and a study of the several figures of the drawing.

SUMMARY

A method and apparatus are provided for disabling High Speed bus operation in a USB 2.0 bus.

An example method for disabling High Speed bus operation includes monitoring a Universal Serial Bus (USB) for a bus reset signal and disabling a High Speed handshake protocol on the USB during a handshake window period after a detection of a reset if a High Speed disable signal is present. The High Speed disable signal can be the result of the detection of a high common mode voltage on the bus or can be for other reasons where lower data rates are desired.

A first example apparatus includes handshake window enabler having a pair of differential inputs and a window enablement output, a common mode detector coupled to a power input and a ground input and having a handshake inhibit output, and a handshake disabler coupled to the handshake window enabler, the common mode detector, and the pair of differential inputs. If a common mode voltage that out of range ("too high") is detected, High Speed handshake protocols will be disabled.

A second example apparatus includes: a handshake window enabler having a pair of differential inputs and a window enablement output, wherein the handshake window enabler includes a USB reset detector and a one shot multivibrator coupled to the USB reset detector; a common mode detector coupled to a power input and a ground input and having a handshake inhibit output, wherein the common mode detector includes a ground line resistor provided between the ground input and a ground output, a ground comparator coupled to the ground input, a power comparator coupled to the power input, and a latch having a set input coupled to the ground comparator and a reset input coupled to the power comparator; a handshake disabler coupled to the pair of differential inputs; and an AND gate having inputs coupled to the window enablement output and the handshake inhibit output and an output coupled to a control input of the handshake disabler.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTION OF EXAMPLE EMBODIMENTS

Figure 1:
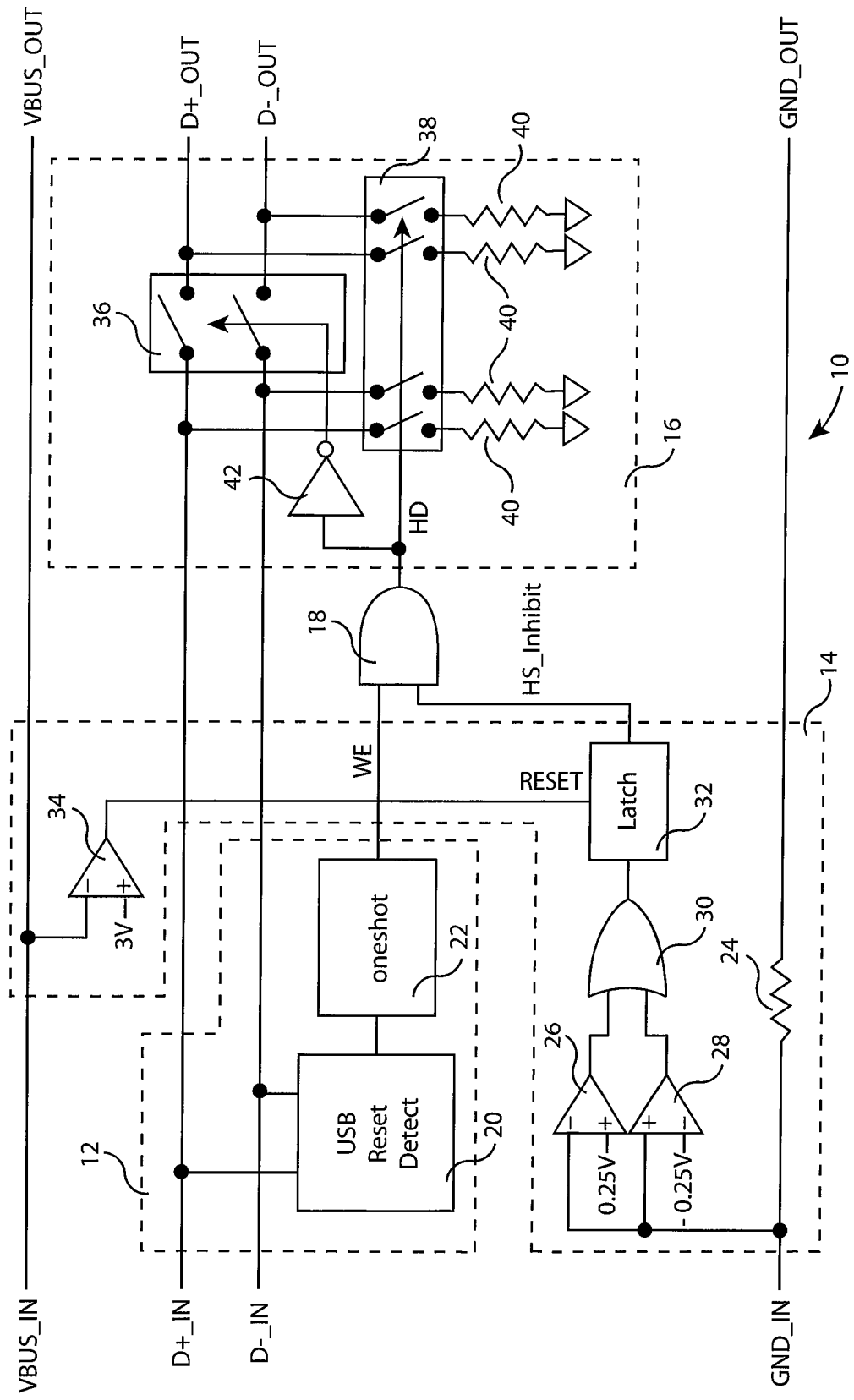
FIG. 1 is a block diagram of a first example embodiment of an apparatus for disabling High Speed bus operation under high common mode voltage conditions.

In FIG. 1, an apparatus 10 for disabling High Speed bus operation, set forth by way of example and not limitation, includes a handshake window enabler 12, a common mode detector 14, and a handshake disabler 16. The handshake window enabler 12 has a pair of differential inputs D+_IN and D−_IN and a window enablement output WE. The common mode detector 14 is coupled between a power input VBUS_IN and a ground input GND_IN and has a handshake inhibit output HS_Inhibit. The handshake disabler 16 is coupled to the WE output of handshake window enabler 12 and to the HS_Inhibit output of common mode detector 14 by an AND gate 18 and to the differential pair D+_IN and D−_IN.

The handshake window enabler 12, in this non-limiting example, includes a USB Reset Detector 20 and a One Shot Multivibrator (One Shot) 22. THE USB Reset Detector 20 has inputs coupled to the D+_IN and D−_IN lines and an output coupled to an input of the One Shot 22. The output of One Shot 22 develops the window enablement signal WE. In this non-limiting example, the USB Reset Detector detects a bus reset when both D+IN and D−_IN are LO for approximately 2.5 microseconds and triggers the One Shot 22 output WE to go HI for approximately 9 milliseconds. In this example, the 9 milliseconds comprises a "handshake window" during which High Speed handshakes can occur.

The common mode detector 14 includes, in this non-limiting example, a ground line resistor 24 between GND_IN and GND_OUT, a pair of comparators 26 and 28, an OR gate 30, a latch 32 and a comparator 34. In this example, the comparators 26 and 28 are referenced to +0.25 V and −0.25V such that the output of OR gate 30 is HI if GND_IN is out of the range of −0.25V to +0.25V (a range of acceptable common mode voltages). If the common mode voltages are out of range, OR Gate 30 will set latch 32 such that the HS_Inhibit signal is HI. The latch 30 is reset by comparator 34 when VBUS Ind. crosses, for example, a 3V reference voltage. The term "high common mode voltage", as used herein, means a high absolute value for the common mode voltage, either negative or positive, e.g. outside of a range of acceptable common mode voltages.

The handshake disabler 16 includes a normally closed, single-throw, double pole electronic switch 36, a normally open, single-throw, quadruple pole electronic switch 38, four grounding resistors 40, and an inverter 42. In this non-limiting example, electronic switch 36 includes a first differential line electronic switch coupling a first differential input D+_IN to a first differential output D+_OUT and a second differential line electronic switch coupling a second differential input D−_IN to a second differential output D−_OUT. Also in this non-limiting example, electronic switch 38 includes a first electronic switch, a second electronic switch, a third electronic switch and a fourth electronic switch, each of which forms a series connection with one of the four grounding resistors 40. For example, the handshake disabler 16 can include a series connection of a first electronic switch and a first resistor coupling a first differential input of the pair of differential inputs to ground, a series connection of a second electronic switch and a second resistor coupling a second differential input of the pair of differential inputs to ground, a series connection of a third electronic switch and a third resistor coupling the first differential output to ground, and a series connection of a fourth electronic switch and a fourth resistor coupling the second differential input of the pair of differential inputs to ground.

In operation, when the output HD of AND gate 18 is HI (e.g. WE is HI and HS_Inhibit is HI resulting in a handshake disable signal), electronic switch 36 opens and electronic switch 38 closes to isolate and ground each of D+_IN, D+_OUT, D−_IN and D−_OUT. This effectively stops any handshake communication on the D+ and D− lines for the duration of the handshake window. When the output HD of AND gate 18 is LO, electronic switch 36 closes and electronic switch 38 opens, allowing normal communication on the D+ and D− lines.

Figure 2:
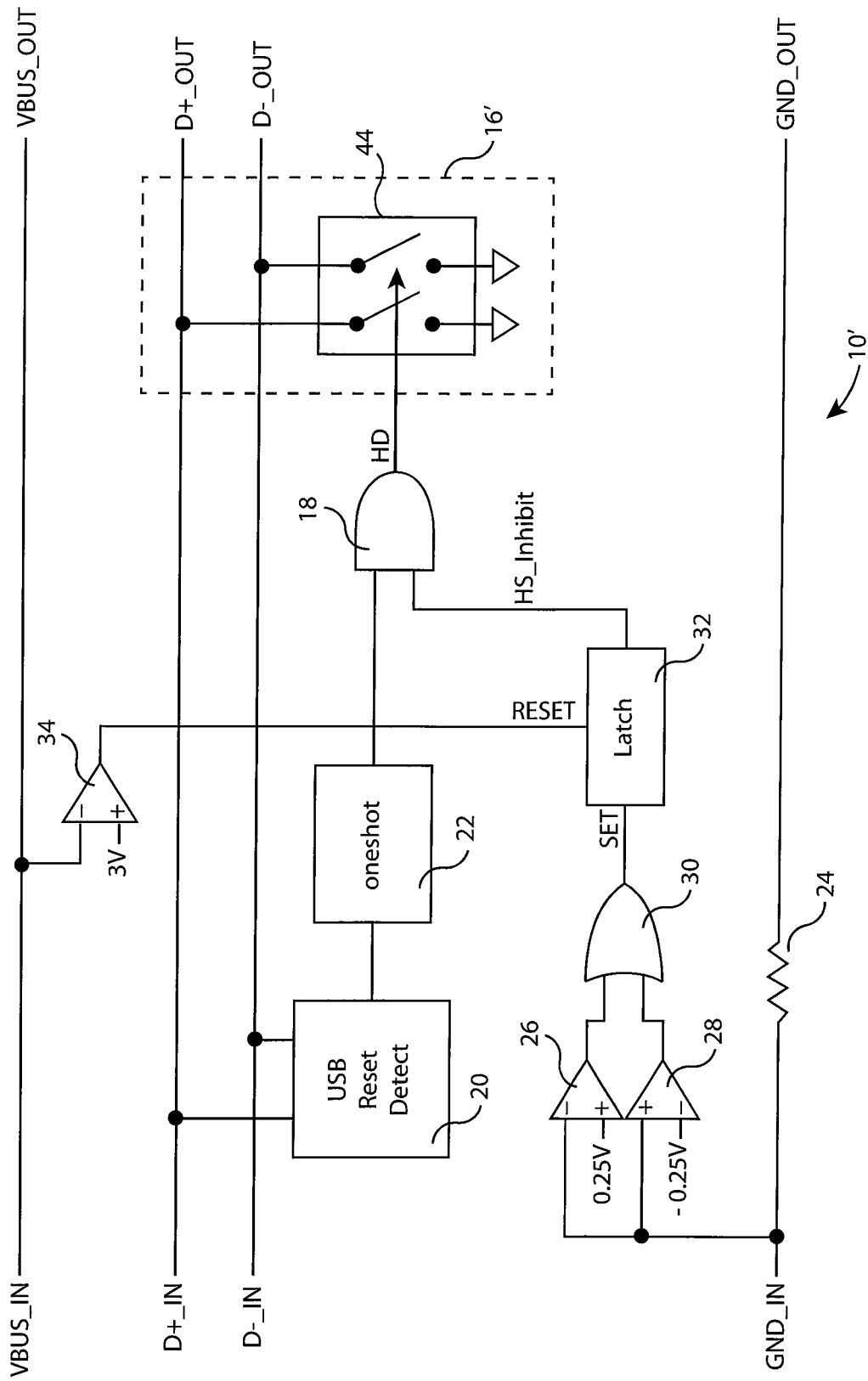
FIG. 2 is a block diagram of a second example embodiment of an apparatus for disabling High Speed bus operation under high common mode voltage conditions.

In FIG. 2, an alternative apparatus 10' for disabling High Speed bus operation is illustrated, where like reference numerals are used for like devices in FIGS. 1 and 2. In this second example embodiment, apparatus 10' for the first example embodiment only in the configuration of handshake disabler 16'. In this non-limiting embodiment, when the output HD is HI (e.g. a handshake disable signal), a double-throw, single pole, normally open electronic switch 44 is closed, shorting the D+ and D− lines to ground and preventing any handshake communication for the duration of the handshake window. In this alternate example embodiment, the electronic switch can include a pair of electronic switches coupling the pair of differential inputs to ground, wherein the pair of electronic switches are controlled via the control input of the handshake disabler.

Figure 3:
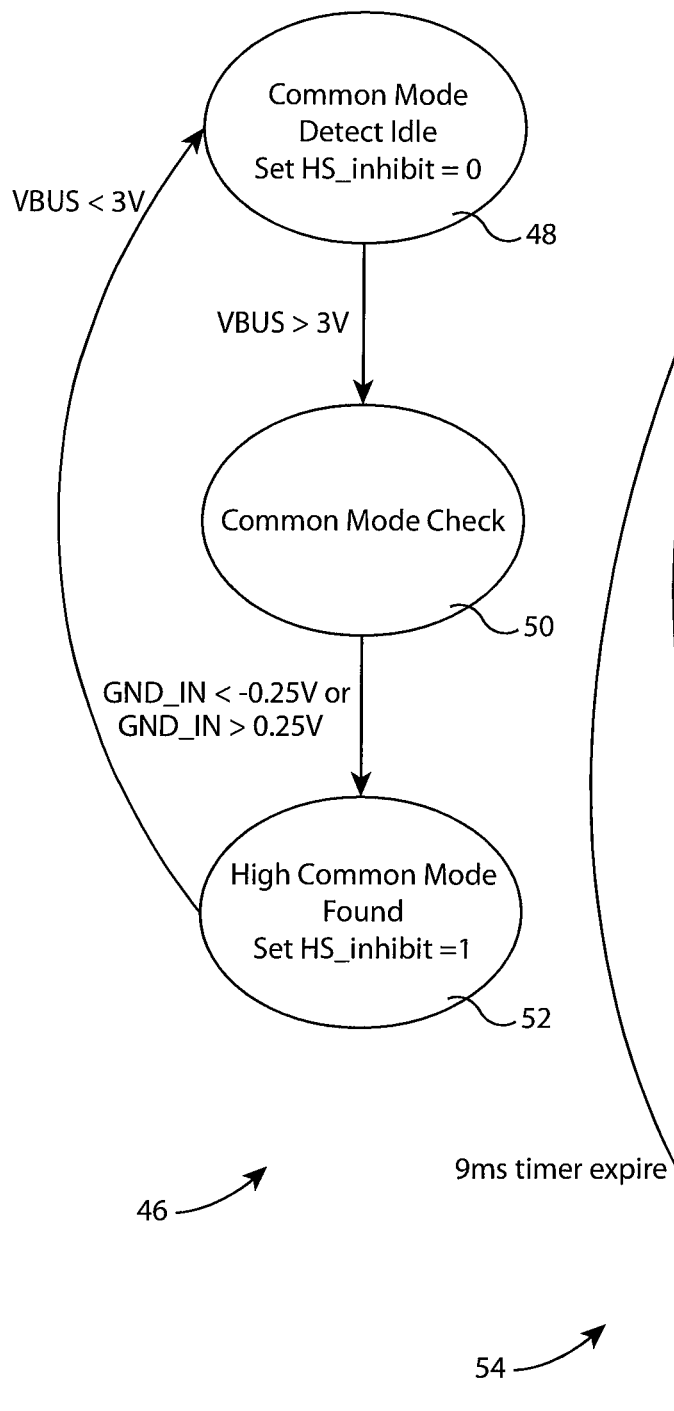
FIG. 3 is a flow diagram illustrating an example common mode detection process.

FIG. 3 is a flow diagram illustrating an example common mode detection process 46 which, in this example embodiment, is implemented by the hardware of the common mode detector 14. Common mode detection idles at 48 with HS_Inhibit set at "0" or "LO" until VBUS exceeds 3V. Next, in an operation 50, the common mode voltage is checked to see if it is in range, e.g. from −0.25V to +0.25V. If the common mode voltage is outside of the range, and operation 52 set HS_Inhibit to "1" or "HI", and if VBUS drops below 3V process control returns to operation 48.

Figure 4:
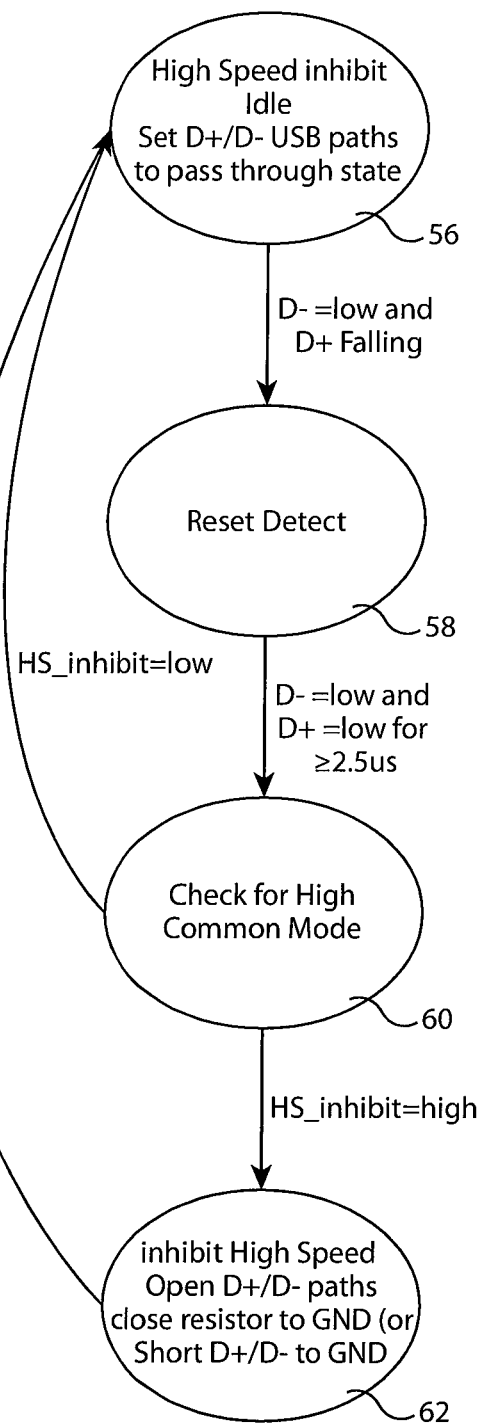
FIG. 4 is a flow diagram illustrating an example High Speed inhibit process.

FIG. 4 is a flow diagram illustrating an example High Speed inhibit process 54 which, in this example embodiment, is implemented by the hardware of FIG. 1 or 2. The process idles in High Speed Inhibit mode in operation 56 until D− is LO and D+ is falling, at which time a reset is detected at operation 58. When D− is LO and D+ is LO for a period of time (e.g. 2.5 μs) an operation checks for high common mode. If HS_Inhibit is LO, control returns to operation 56. If HS_Inhibit is HI, an operation 62 inhibits High Speed by preventing the High Speed handshake protocol on the D+ and D− busses. After the handshake window (a/k/a 9 millisecond timer) expires, control returns to operation 56.

Figure 5:
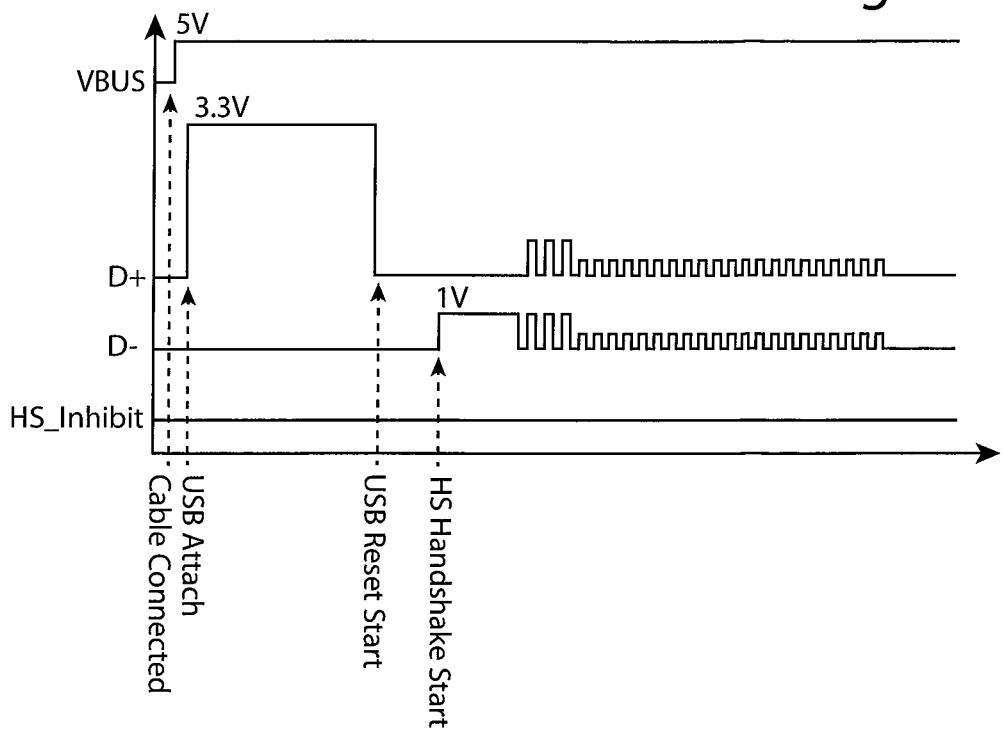
FIG. 5 is a timing diagram illustrating a High Speed handshake process on a USB 2.0 bus.
Figure 6:
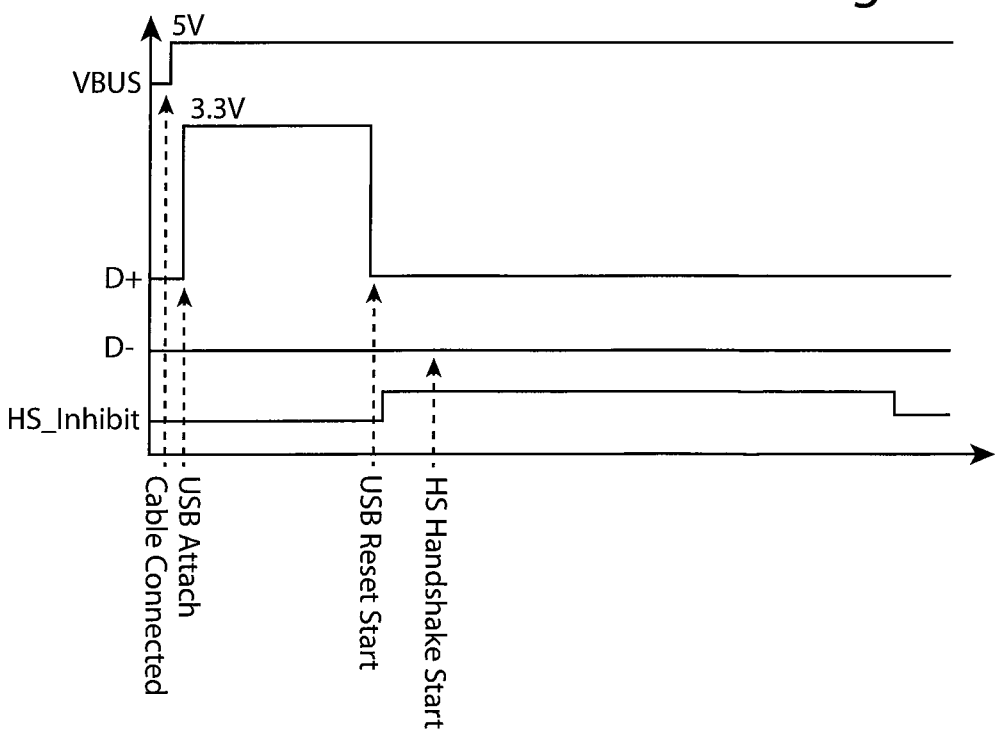
FIG. 6 is a timing diagram illustrating the High Speed handshake process being inhibited on a USB 2.0 bus.

FIGS. 5 and 6 are timing diagrams illustrating the operation of the apparatus and methods described above. In FIG. 5, the HS_Inhibit is LO and, as can be seen at the point "HS Handshake Start", the D+ and D− lines are allowed to perform their handshake processes to configure the bus for High Speed operation. In FIG. 6, shortly after USB Reset Start, the HS_Inhibit line is HI (due to the detection of a high common mode voltage, e.g. a common mode voltage that is out of range), and the D+ and D− lines are grounded, preventing any handshaking processes to occur.

While various embodiments have been discussed wherein High Speed operation is disabled when high common mode voltages are present on the bus, there are other reasons why disabling High Speed operation may be desirable. For example, if the host and client do not need high data rate communication, it may be desirable to disable High Speed operation in order to reduce power consumption, reduce radiation, increase bus length, etc. The HS_Inhibit signal can therefore be generated in a number of fashions, including simply tying the HS_Inhibit line to the power bus.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A method for disabling high speed bus operation comprising:
   developing a window enablement signal by triggering a one shot multivibrator when detecting a USB reset signal on a differential pair of data lines of a Universal Serial Bus (USB);
   developing a handshake inhibit signal when detecting a high common mode voltage condition between a power input and a ground input of the USB; and
   disabling a high speed handshake protocol on the differential pair of data lines when both the window enablement signal and the handshake inhibit signal are present.

2. A method for disabling high speed bus operation as recited in claim 1 wherein detecting a high common mode voltage condition comprises detecting a common mode voltage between the power input and the ground input and determining that the common mode voltage is out of a range of voltages.

3. A method for disabling high speed bus operation as recited in claim 1 wherein disabling a high speed protocol comprises coupling the pair of differential lines to ground when both the window enablement signal and the handshake inhibit signal are present.

4. A method for disabling USB high speed bus operation comprising:
   (a) monitoring a USB data bus while in a high speed inhibit idle state;
   (b) detecting a reset signal on the USB data bus and triggering a one shot multivibrator;
   (c) determining if the USB is in a high common mode state from a power input voltage and a ground input voltage and, if not, returning to operation (a); and
   (d) entering a high speed inhibit state for a period of time determined by the one shot multivibrator and thereafter returning to operation (a).

5. A method for disabling USB high speed bus operation as recited in claim 4 wherein the USB data bus comprises a differential pair including a D+ line and a D− line.

6. A method for disabling USB high speed bus operation as recited in claim 5 wherein detecting a reset signal on the USB data bus comprises a low logic state on both the D+ line and the D− line.

7. A method for disabling USB high speed bus operation as recited in claim 4 wherein determining if the USB is in a high common mode state comprises monitoring the power input and the ground input to the USB and developing a handshake inhibit signal when the power input voltage exceeds a voltage limit level and when the ground input voltage is outside of a range of voltages.

8. A method for disabling USB high speed bus operation as recited in claim 7 wherein monitoring the power input and the ground input comprises:
   (a) monitoring the power input and remaining in a common mode detect idle state until a voltage on the power input exceeds a voltage limit level;
   (b) identifying a high common voltage state when the voltage on the ground input is outside of a range of voltages and while the USB is not in a common mode detect idle state; and
   (c) developing a high speed inhibit signal returning to operation (a) after the voltage on the power input falls below the voltage limit level.

9. An apparatus for disabling high speed USB operation under high common mode voltage conditions comprising:
   a Universal Serial Bus (USB) signal input;
   a handshake window enabler coupled to the USB signal input and operative to develop a window enablement signal upon the detection of a USB reset signal on the USB signal input, wherein the handshake window enabler includes a USB reset detector and a one shot multivibrator coupled to the USB reset detector;
   a common mode detector coupled to a USB power input and a USB ground input for detecting a high common mode voltage condition and operative to develop a handshake inhibit signal when a high common mode voltage condition is detected;
   a handshake disabler coupled to the USB signal input, the handshake window enabler, and the common mode detector such that a USB high speed handshake protocol is disabled when both the window enablement signal and the handshake inhibit signal are present.

10. An apparatus for disabling high speed USB operation under high common mode voltage conditions as recited in claim 9 wherein the USB signal input comprises a differential pair.

11. An apparatus for disabling high speed USB operation under high common mode voltage conditions as recited in claim 10 further comprising logic coupling an output of the handshake window enabler and an output of the common mode detector to an input of the handshake disabler.

12. An apparatus for disabling high speed USB operation under high common mode voltage conditions as recited in claim 10 wherein the handshake disabler includes a pair of electronic switches selectively coupling the pair of differential inputs to ground.

13. An apparatus for disabling high speed USB operation under high common mode voltage conditions as recited in claim 10 wherein the handshake disabler includes a series connection of a first electronic switch and a first resistor coupling a first differential input of the pair of differential inputs to ground, and a series connection of a second electronic switch and a second resistor coupling a second differential input of the pair of differential inputs to ground.

14. An apparatus for disabling high speed USB operation under high common mode voltage conditions as recited in claim 10 wherein the handshake disabler further comprises a first differential line electronic switch coupling the first differential input to a first differential output and a second differential line electronic switch coupling the second differential input to a second differential output.

15. An apparatus for disabling high speed USB operation under high common mode voltage conditions as recited in claim 14 further comprising an inverter coupling the output of the logic to the first differential line electronic switch and to the second differential line electronic switch.

16. An apparatus for disabling high speed USB operation under high common mode voltage conditions as recited in claim 14 wherein the handshake disabler further comprises a series connection of a third electronic switch and a third resistor coupling the first differential output to ground, and a series connection of a fourth electronic switch and a fourth resistor coupling the second differential input of the pair of differential inputs to ground.

17. An apparatus for disabling high speed USB operation under high common mode voltage conditions as recited in claim 9 wherein the common mode detector includes a resistor provided between the USB ground input and a USB ground output, a ground comparator coupled to the USB ground input, a power comparator coupled to the USB power input, and a latch having a set input coupled to an output of the ground comparator and a reset input coupled to an output of the power comparator.

18. An apparatus for disabling high speed USB operation under high common mode voltage conditions comprising:
   a Universal Serial Bus (USB) signal input comprising a differential pair;
   a handshake window enabler coupled to the USB signal input and operative to develop a window enablement signal upon the detection of a USB reset signal on the USB signal input;
   a common mode detector coupled to a USB power input and a USB ground input for detecting a high common mode voltage condition and operative to develop a handshake inhibit signal when a high common mode voltage condition is detected;
   a handshake disabler coupled to the USB signal input, the handshake window enabler, and the common mode detector such that a USB high speed handshake protocol is disabled when both the window enablement signal and the handshake inhibit signal are present; and
   logic coupling an output of the handshake window enabler and an output of the common mode detector to an input of the handshake disabler;
   wherein the logic performs the AND function.

* * * * *